United States Patent [19]

Scovill

[11] 4,253,150
[45] Feb. 24, 1981

[54] PICTORIAL NAVIGATION COMPUTER

[76] Inventor: Royal J. Scovill, 676 Lakewoode Cir. East, Delray Beach, Fla. 33444

[21] Appl. No.: 946,962

[22] Filed: Sep. 29, 1978

[51] Int. Cl.³ .............................................. G06F 15/50
[52] U.S. Cl. ................................... 364/449; 364/448; 364/444; 343/112 C; 242/200
[58] Field of Search ............... 364/443, 444, 445, 447, 364/448, 449; 343/112 C, 112 PT, 107; 353/11, 12; 73/178 R; 340/24, 27 NA; 242/200, 205

[56] References Cited

U.S. PATENT DOCUMENTS

| | | | |
|---|---|---|---|
| 3,410,497 | 11/1968 | Henriquez | 242/200 |
| 3,474,556 | 10/1969 | Scovill | 343/112 PT |
| 3,475,754 | 10/1969 | Scovill | 364/449 |
| 3,570,783 | 3/1971 | Winkler et al. | 242/205 |
| 3,652,836 | 3/1972 | Richardson et al. | 343/112 C |
| 3,652,837 | 3/1972 | Perkins | 343/112 C |
| 3,836,690 | 9/1974 | Purtle, Jr. | 364/444 |
| 3,997,255 | 12/1976 | Van Oosten | 353/12 |
| 4,016,406 | 4/1977 | Abe et al. | 235/92 MP |
| 4,086,632 | 4/1978 | Lions | 364/448 |
| 4,138,726 | 2/1979 | Girault et al. | 364/443 |

Primary Examiner—Charles E. Atkinson
Assistant Examiner—Gary Chin
Attorney, Agent, or Firm—Leydig, Voit, Osann, Mayer & Holt

[57] ABSTRACT

An on-board computer for movable craft which will control various operational functions and provide the pilot with continuous navigational information. The computer continuously determines the position of the craft with respect to the earth's surface and provides a continuous pictorial display of such position, utilizing bearing or distance information from fixed location radio navigation transmitters such as VOR, LORAN, ADF, DME or TACAN. The computer includes a microprocessor, a memory bank, and navigational charts on photographic film. The stored information in the computer may be periodically updated by replacing or renewing the information in the memory bank and replacing the film. The apparatus may include provision for read-out of ground speed, time to destination, bearing and distance to a navigation station, way station, or destination.

13 Claims, 12 Drawing Figures

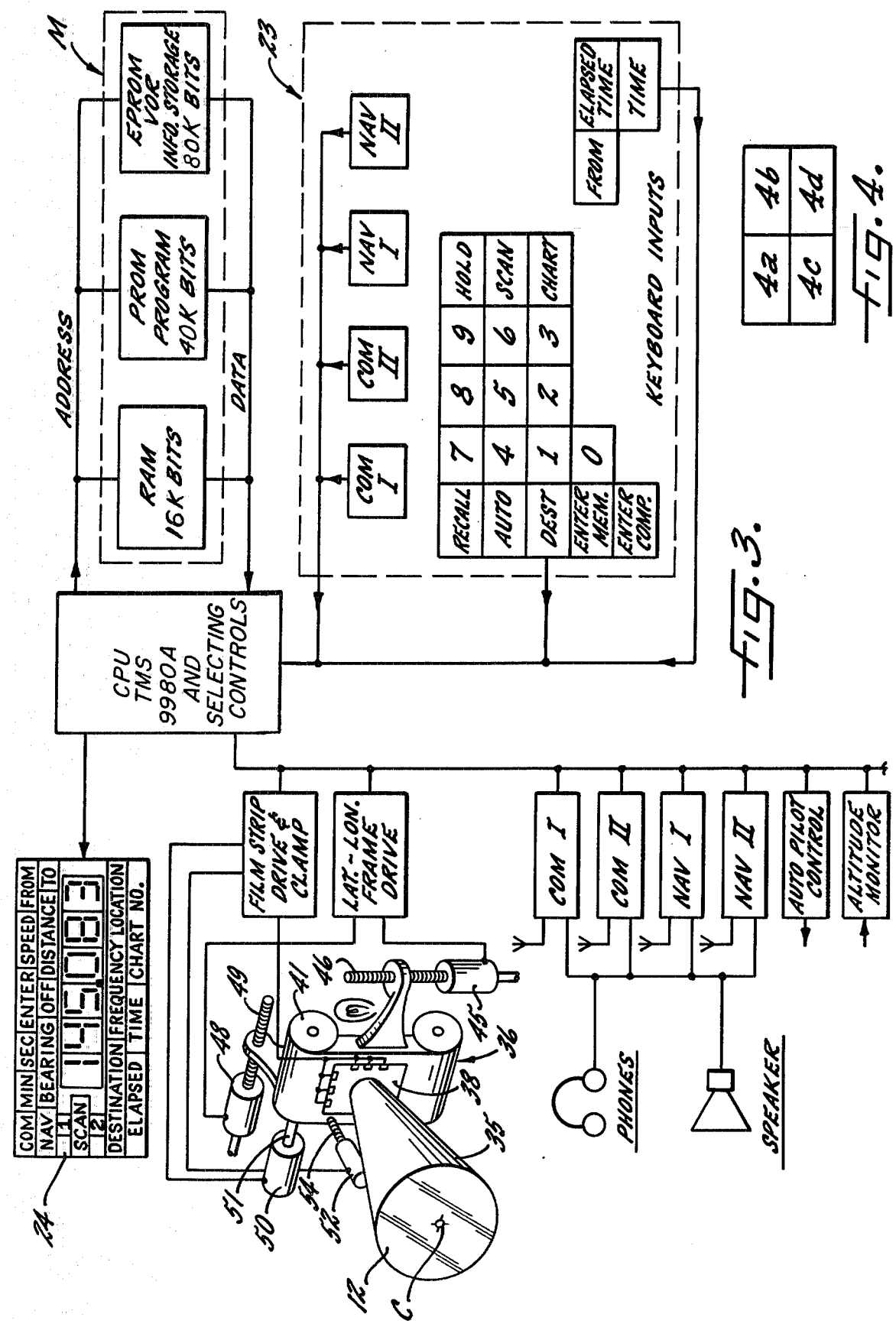

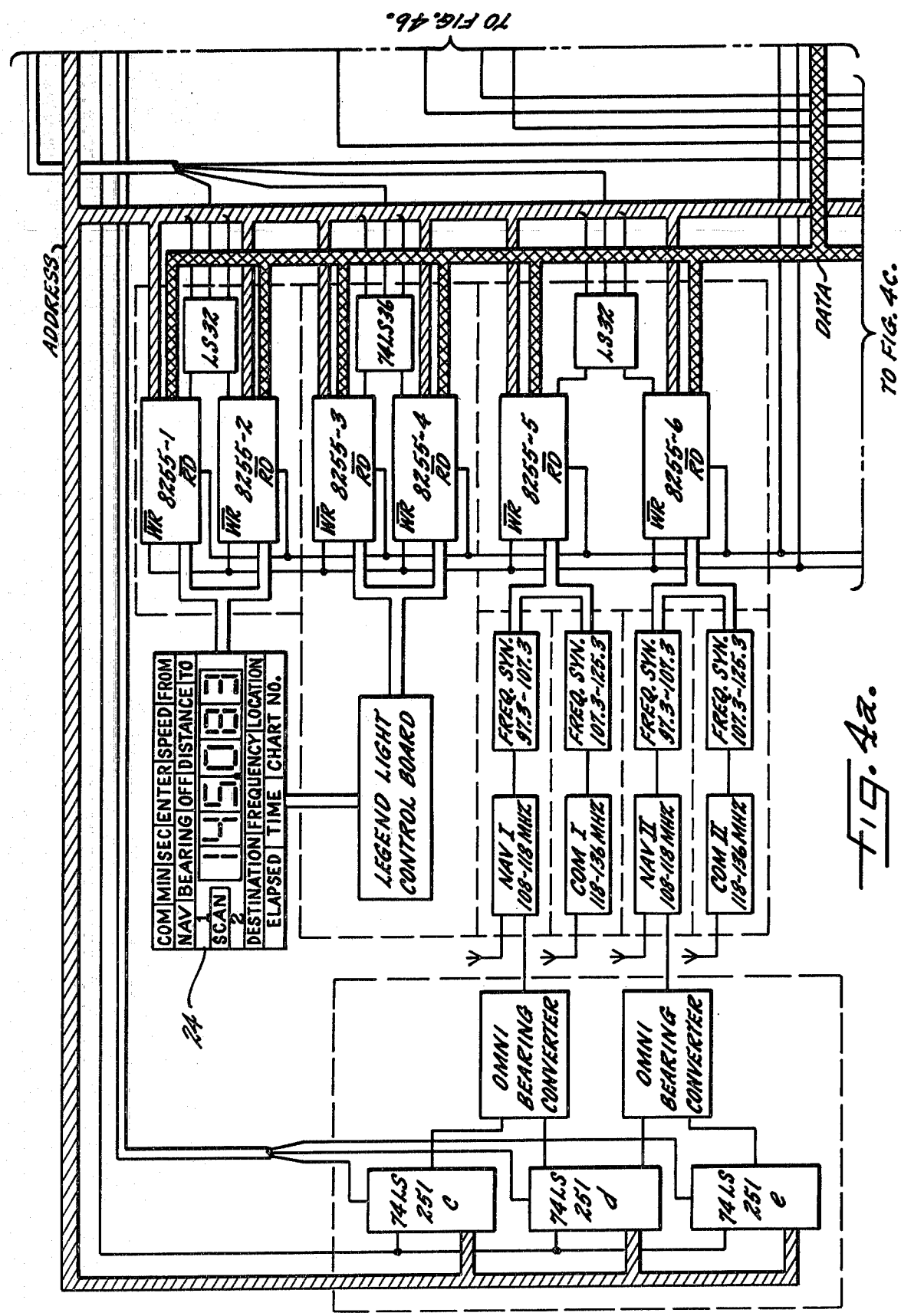

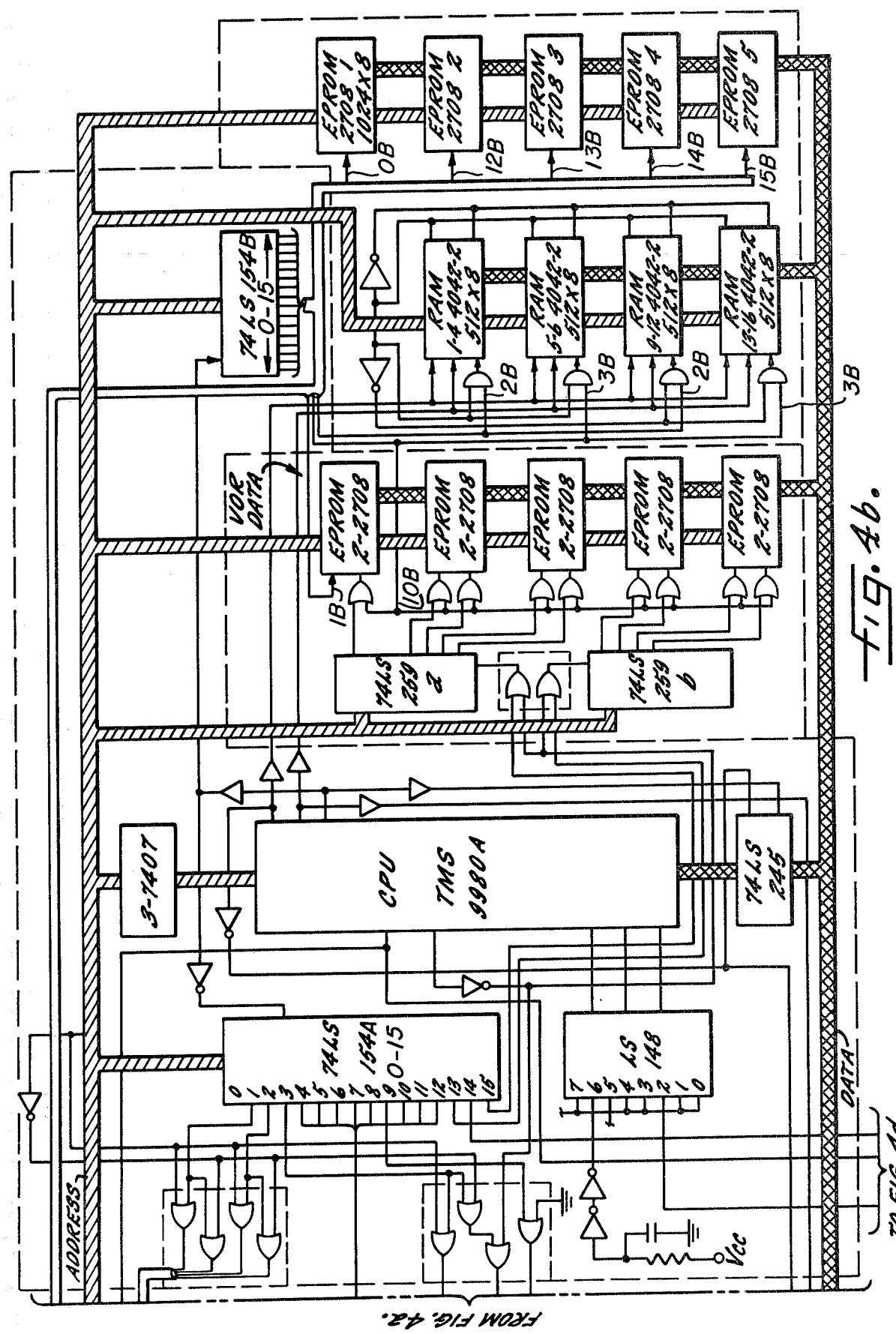

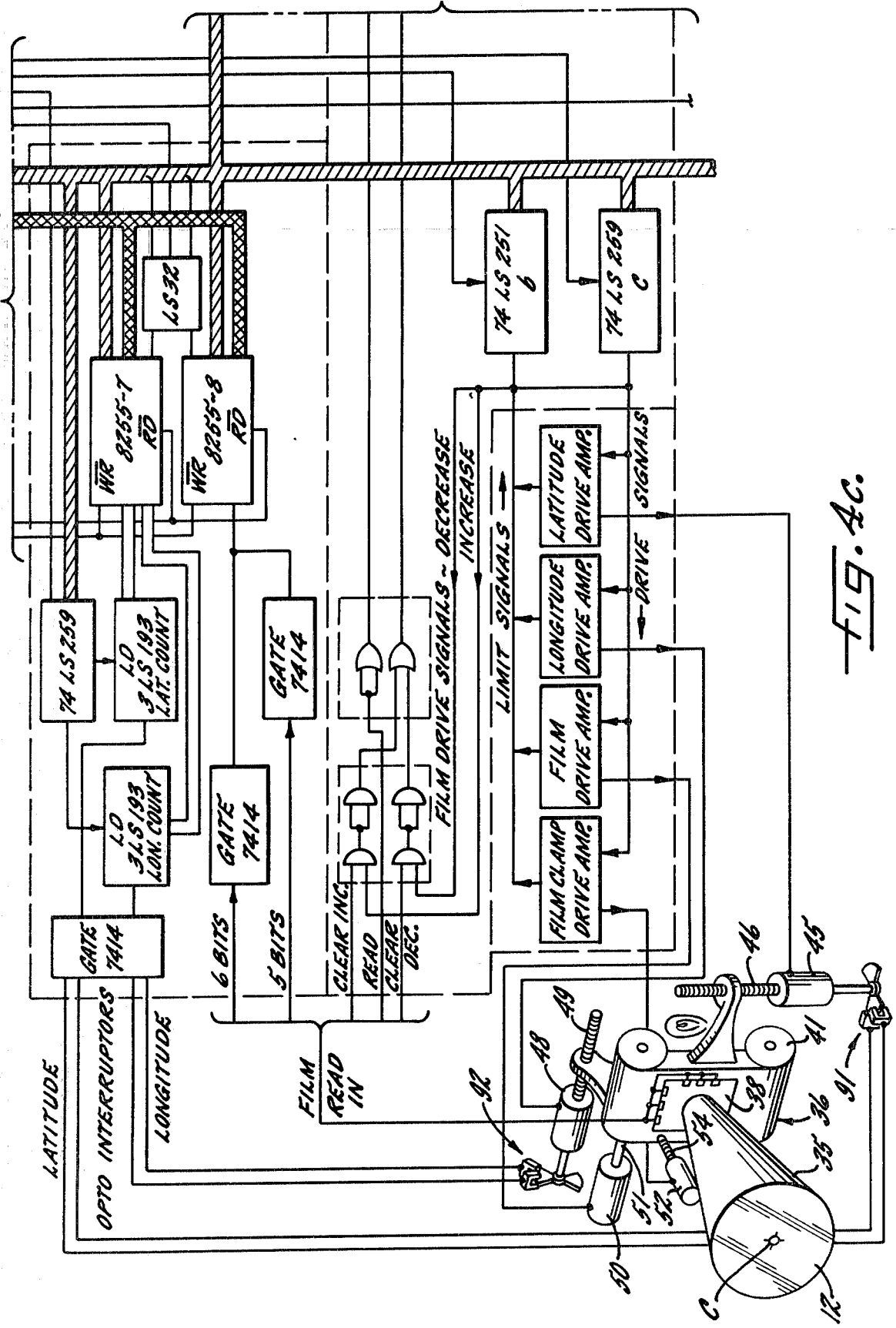

PICTORIAL NAVIGATION COMPUTER

DESCRIPTION OF THE INVENTION

The present invention relates in general to an on-board computer for movable craft and, more specifically, to a pictorial navigation computer which will control various operational functions and provide the pilot of the craft with continuous navigational information. This invention is an improvement over the navigational systems disclosed in my prior U.S. Pat. No. 3,475,754 and No. 3,474,556, both issued Oct. 28, 1969.

The general aim of the present invention is to provide an on-board computer for aircraft, ships, or other conveyances and which is adapted to perform continuously navigational, control, and monitoring functions connected with the operation of the craft, utilizing bearing or distance information from ground based radio navigation systems such as VOR, LORAN, ADF, DME or TACAN, together with information stored on board.

A further object of the invention is to provide a pictorial navigation computer of the foregoing type which utilizes a microprocessor, a memory bank, and navigation charts on photographic film, the computer being operable by the pilot with convenience and a minimum of diversion from his normal operational duties aboard the craft.

Another object of the invention is to provide a pictorial navigation computer of the character noted above and which is adapted to enable the pilot to make a rapid, positive check on the identity and location of each radio transmitting station as stored in the memory compared with its location as projected on a viewing screen, prior to using the station for bearing reference, and to provide means for the pilot to enter corrected data if necessary.

Still another object of the invention is to provide a pictorial navigation computer of the type set forth above wherein the stored information in the computer may be periodically updated by replacing or renewing the information in the memory bank and by replacing the chart film.

A further object of the invention is to provide a computer of the foregoing type including provision for digital read-out of ground speed; time to destination; bearing and distance to navigation station, way station or destination; as well as read-out and control of other operational functions which may be programmed.

Other objects and advantages of the invention will become apparent from the following detailed description, taken with the accompanying drawings, in which:

FIG. 3 is a general schematic view of the principal components included within the computer of FIGS. 1 and 2.

Figure 1:
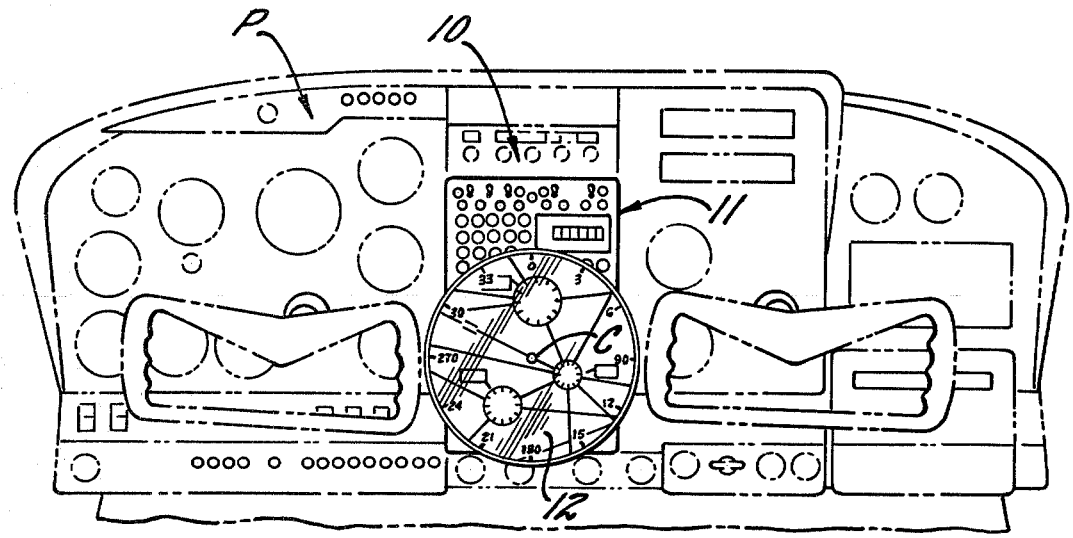
FIG. 1 is an elevational view of the instrument panel of a single engine aircraft equipped with a pictorial navigation computer exemplifying the present invention.
Figure 4D:
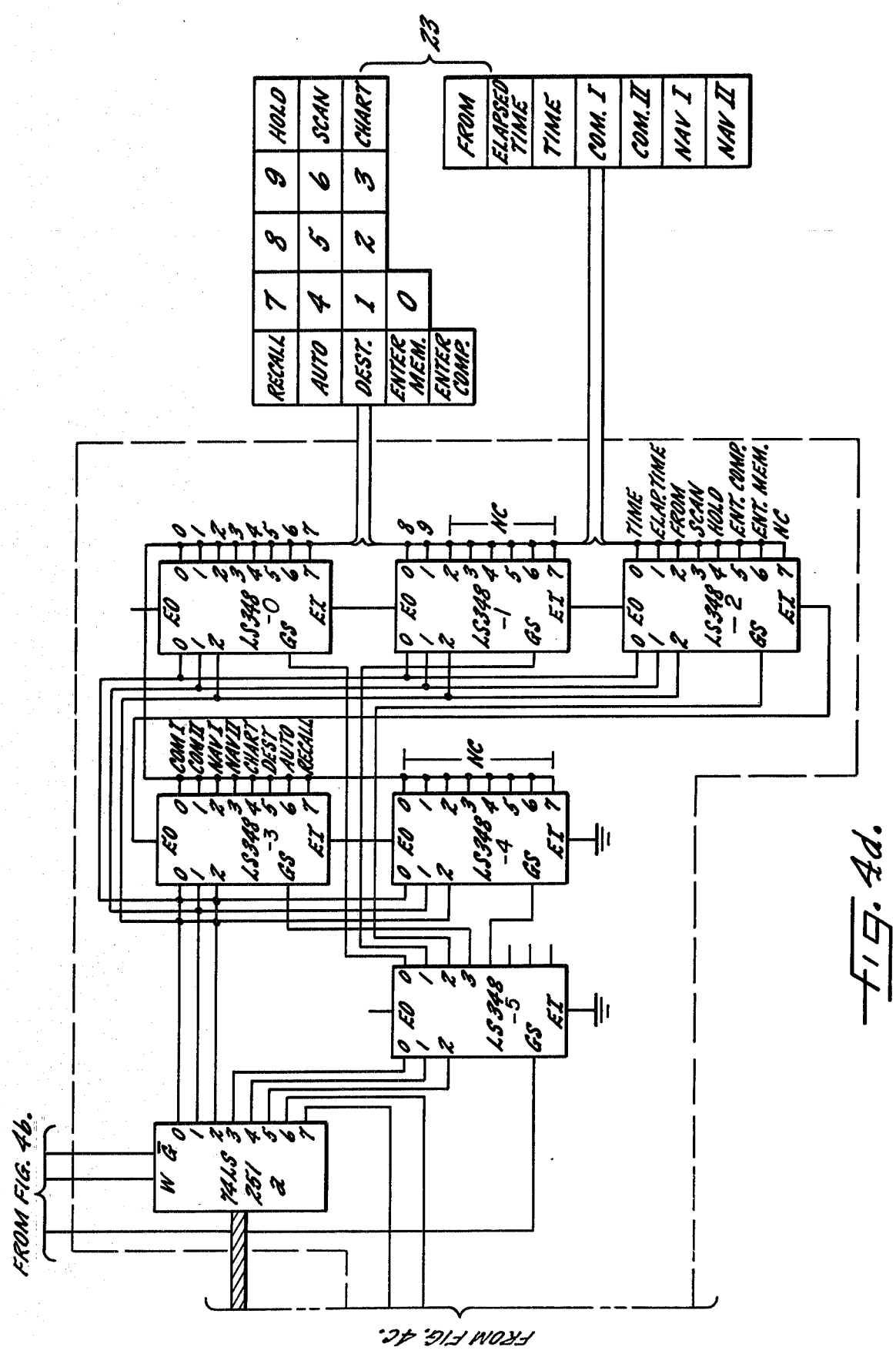
FIG. 4 is a diagramatic view illustrating the relationship between the schematic electrical system diagrams shown in FIGS. 4a, 4b, 4c, and 4d.

FIG. 4a shows the upper left quadrant of the schematic electrical system diagram for the computer of FIG. 1; FIG. 4b shows the upper right quadrant of said diagram; FIG. 4c shows the lower left quadrant of said diagram; and FIG. 4d shows the lower right quadrant of said diagram.

Figure 5:
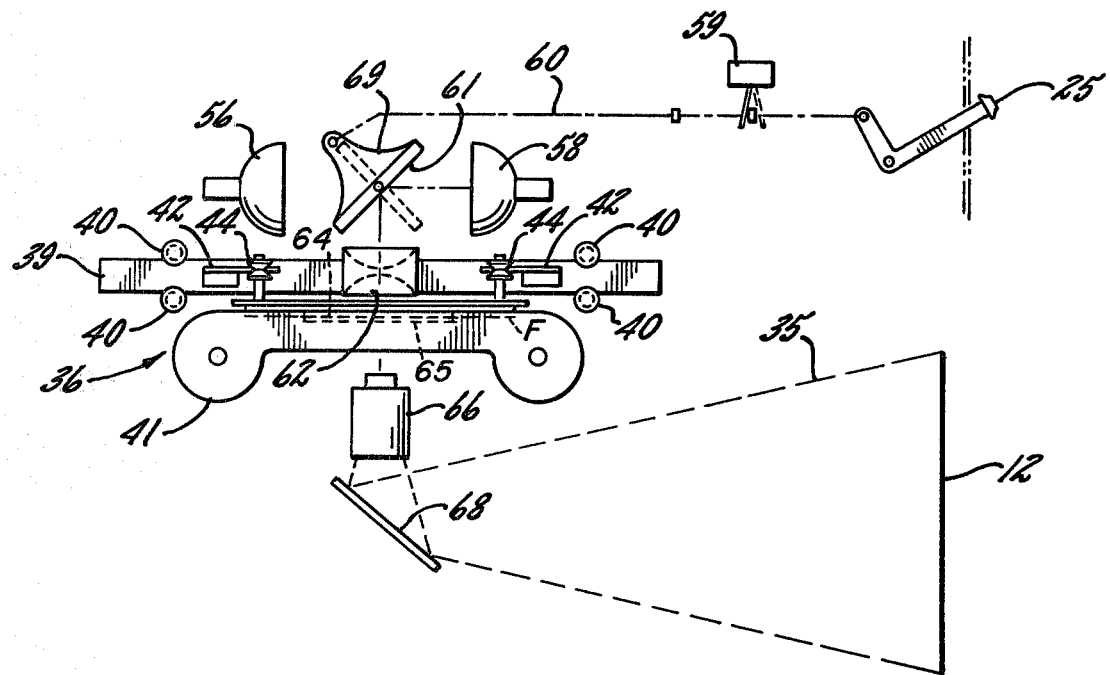

FIG. 5 is a diagramatic view of the film projection system and viewing screen embodied in the computer of FIG. 1.

Figure 6:
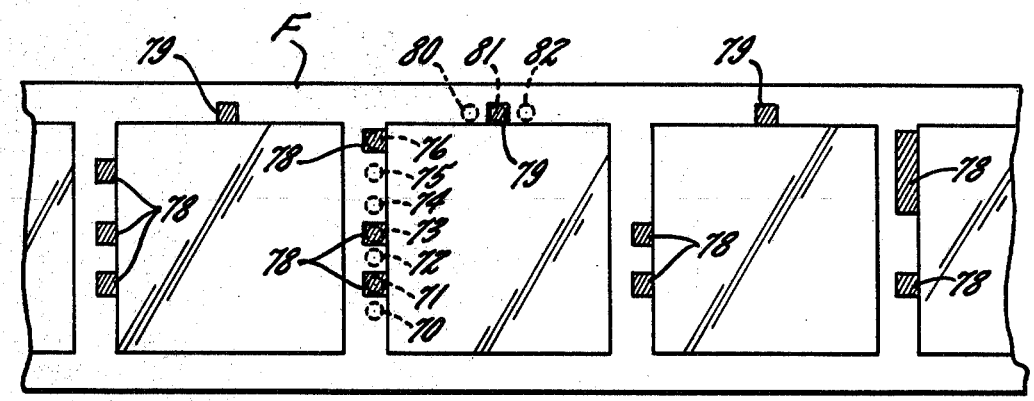

FIG. 6 is a plan view of a section of film used in the computer of FIG. 1 comprising a series of film frames each depicting a navigational chart for a given region and having distinctive retrieval indicia associated therewith.

Figure 7:
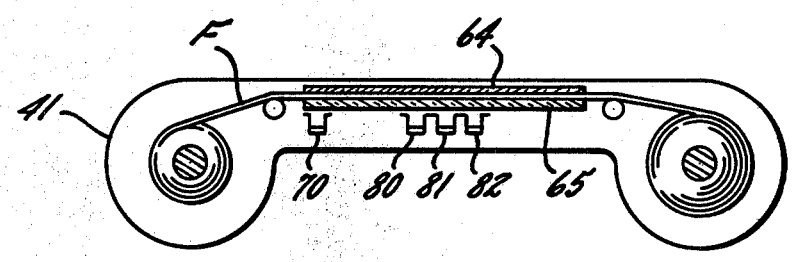

FIG. 7 is a longitudinal sectional view through the film magazine of the computer showing the film clamping means and indicia reading devices.

Figure 8:
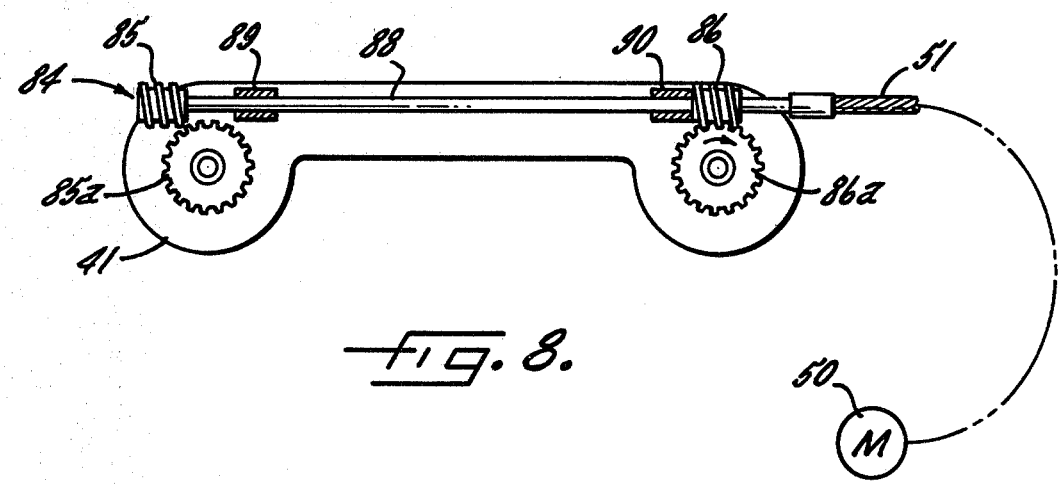

FIG. 8 is a side elevational view of the film magazine illustrating the associated portion of the film drive mechanism.

While the invention is susceptible of various modifications and alternative constructions, a certain illustrative embodiment has been shown in the drawings and will be described below in considerable detail. It should be understood, however, that there is no intention to limit the invention to the specific form described but, on the contrary, the intention is to cover all modifications, alternative constructions and equivalents falling within the scope of the appended claims.

GENERAL ORGANIZATION OF COMPUTER

Figure 2:
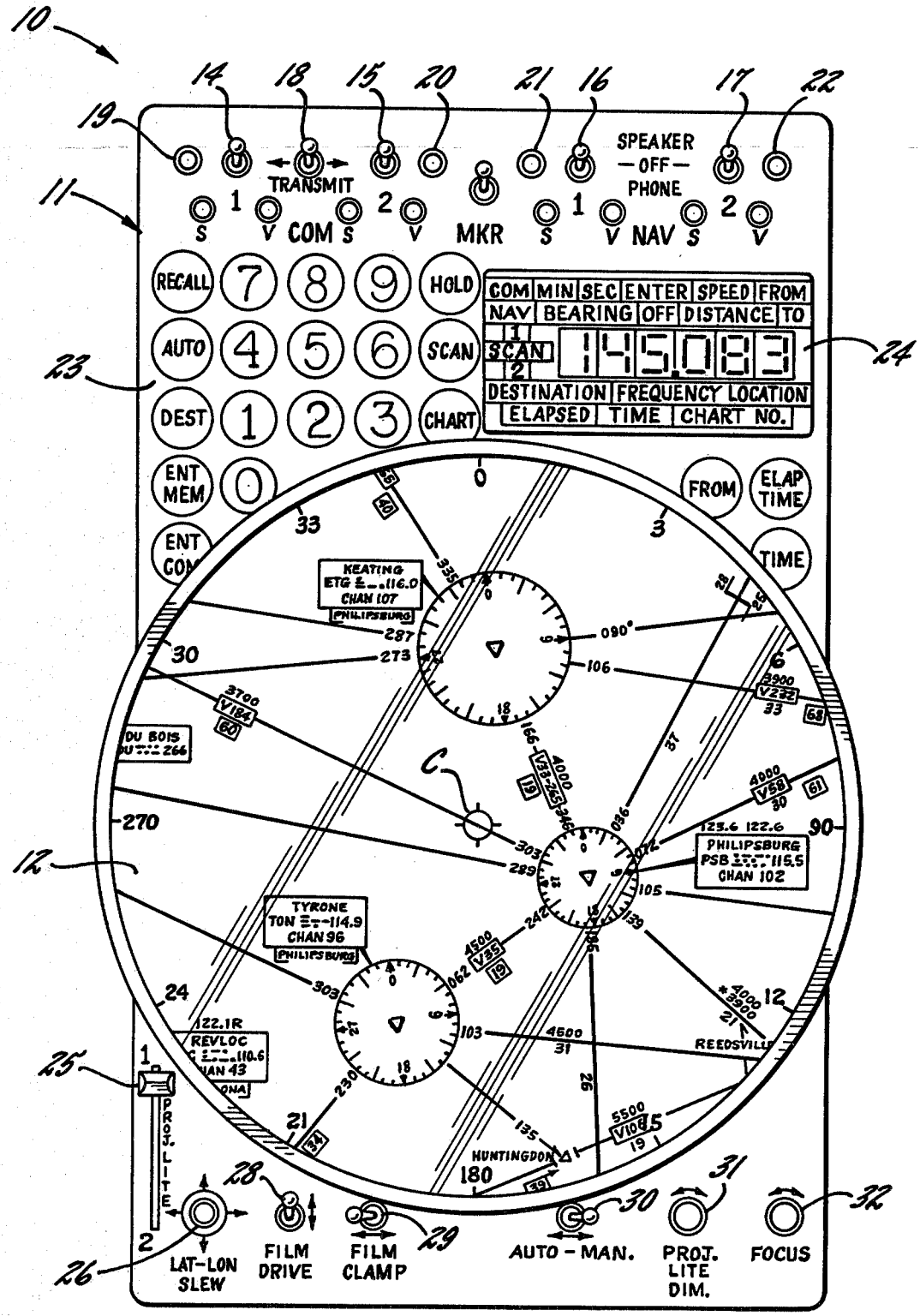
FIG. 2 is an enlarged front elevational view of the pictorial navigational computer shown in FIG. 1.

Referring more specifically to FIGS. 1 and 2, it will be noted that the invention is there exemplified in a computer 10 mounted in an illustrative instrument panel P typical of a single engine aircraft. The computer is housed within a console 11 of appropriate size to fit within the space in the instrument panel heretofore reserved for the conventional navigation and communication radio units. In addition to its other components, the computer 10 includes a pair of communication radio receiver transmitters COM 1 and COM 2, a pair of navigation radio receivers NAV 1 and NAV 2, and a pair of omni bearing digital indicators. These radio units are of greatly reduced size but capable of equal or better performance than the conventional radio units.

The front face of the console 11 comprises a back lighted viewing screen 12, in this instance approximately 8 inches in diameter, on which filmed navigation charts are projected. The position of the craft is indicated by a fixed mark or reticle C at the center of the screen 12. Movement of the craft is indicated by movement of the projected image of the chart relative to the reticle under the direction of the computer.

In addition to the screen 12, the front face of the console 11 has disposed across its upper portion a plurality of controls for the communication radios COM 1 and COM 2, and for the navigation radios, NAV 1 and NAV 2. As shown more particularly in FIG. 2, switches 14, 15, 16, 17 are associated with COM 1, COM 2, NAV 1 and NAV 2, respectively, to connect their audio outputs to the cockpit speaker or to the earphones. Two position switch 18 is provided to permit transmission selectively through COM 1 or COM 2. Each of the radios has a volume control knob V, a squelch control knob S, and a respective one of illuminated pushbuttons 19, 20, 21, and 22 for indicating its frequency through the computer readout.

Again referring to FIG. 2, between the radio controls and the screen 12 the front face of the console 11 has a series of illuminated pushbuttons for providing information input to the computer or making inquiry of the computer for information. These are the pushbuttons numbered from 0 to 9, and those marked "RECALL", "AUTO", "DEST" (Destination), "ENT MEM" (Enter Memory), "ENT COM" (Enter Computation), "HOLD", "SCAN", "CHART", "FROM" (Bearing), "ELAP TIME" (Elapsed Time), and "TIME" (Actual Time). This group of pushbuttons, together with the illuminated pushbuttons 19–22 located with the radio controls, represent an input keyboard 23.

To the right of the "HOLD", "SCAN" and "CHART" pushbuttons, the console front has a readout panel 24 for providing digital information from the computer 10 in response to pushbutton inquiries. The panel 24 is arranged with a plurality of designator words which are illuminated selectively to identify the particular digital readout being displayed by the computer. Such readout may, for example, be the frequency of a radio, or bearing in degrees, or distance in miles.

Between the screen 12 and the bottom of the console front face are a series of controls relating primarily to the chart projection system (FIG. 2). These are the projection lamp selector 25; latitude-longitude slew control switch 26 for the chart picture; forward-reverse film drive switch 28; film clamp switch 29; automatic-manual selector switch 30; projection lamp dimmer knob 31; and picture focus adjustment knob 32.

Referring next to the general schematic view presented in FIG. 3, the major components of the computer 10 are there shown diagrammatically and will be related below. At the lower left are the communication radio receiver transmitters COM I and COM II; and the VOR navigation radio receivers NAV I and NAV II including omni bearing digital bearing indicators. Other navigation radio receivers such as Loran, ADF and DME may also be used to provide bearing or position indication to the computer for calculation and production of the instantaneous position of the craft.

A microprocessor CPU, in this instance a 16 bit device, together with an associated static and dynamic memory M, is shown at the upper portion of FIG. 3. The microprocessor CPU and memory M, with other peripheral components, provide a computing device capable of calculating position, bearing and speed; of tuning radios by frequency synthesis; and performing other desired functions. The memory M is used for storing the following information: radio frequencies, destination locations, film frame numbers to be recalled, time and elapsed time intervals, as will be further outlined below.

Further components of the computer 10 comprise a film projection system 34 including the screen 12 and its associated hood 35, both fixed, and the magazine and carriage assembly 36, mounted for movement transversely of the projection axis and the screen 12, with associated drives.

To enable the pilot to control and operate the computer, the device includes input keyboard 23, shown on the right hand side of FIG. 3, and readout panel 24, shown at the upper left of FIG. 3.

Utilizing the continuous output of position of the craft with reference to fixed ground locations of the navigation radio facilities and destination, the computer is programmed to calculate position, bearing and speed. This information in digital form is displayed and identified by appropriate illuminated legends in the readout panel 24. Positioning of the projected chart image with respect to the reticle C on the screen 12 is thus accomplished by comparison of the calculated position against the actual count of position of the image. Signals are then sent through electronic latches to activate the latitude-longitude drives to move the chart image to the calculated position with respect to the reticle C. Such positioning provides digital information from which the computer may calculate speed and direction of travel as desired.

LATITUDE-LONGITUDE POSITIONING OF FILM

The film magazine and carriage assembly 36 (FIGS. 3 and 5) is adapted to display one selected frame 38 of film at a time, each frame depicting one regional navigational chart. Each film frame represents 400 miles in both the latitudinal and longitudinal coordinates. However, the projected image on the screen 12 at any given instant shows only a portion of the total area covered by the film frame. The latter must be moved transversely of the projection axis in synchronism with the motion of the craft to keep the indicated position at the reticle current.

The carriage and magazine assembly 36 (FIG. 5) comprises a supporting frame 39 mounted for reciprocating movement transversely of the projection axis as by means of guide rollers 40. The magazine 41, being supported on the frame 39, moves bodily therewith during reciprocating movement of the frame 39. The magazine 41, in turn, is mounted for reciprocating movement with respect to the frame 39 as by means of guides 42 and grooved rollers 44. Such movement of the magazine 41 is also transverse to the projection axis but in a path which is perpendicular to the reciprocating movement path of the supporting frame 39. By reason of the structural arrangement shown in FIG. 5, reciprocation of the frame 39 carrying the magazine bodily with it positions the film frame 38 in the latitudinal coordinate. Reciprocation of the magazine 41 within and relative to the supporting frame 39 positions the film frame 38 in the longitudinal coordinate.

Power for positioning the magazine and carriage assembly 36 and hence the film frame 38 in latitude and longitude coordinates is provided by a plurality of drives shown schematically in FIG. 3. Positioning in the latitudinal coordinate is effected by latitude drive motor 45 and its lead screw 46. Positioning in the longitudinal coordinate is effected by longitude drive motor 48 and its lead screw 49.

The film may be driven in the forward or reverse direction in the magazine by film strip drive motor 50 and flexible shaft 51. It may be clamped in place during projection by means of clamp motor 52 and lead screw 54.

FILM PROJECTION OPTICS

By reason of constraints on space within the console 11 due to the presence of numerous circuit boards and other components, the optical portion of the film projection system has been turned 90° and partially folded back on itself. Referring more specifically to FIG. 5, it will be perceived that the system includes two reflector type projection lamps 56, 58 situated in spaced relation with each other and overlying the film magazine and carriage assembly 36. Only one of these lamps may be used at a time, the second being provided for purposes of redundancy in the event the first lamp should fail. The lamps 56, 58 may be energized selectively by means of the lever 25, two position switch 59, and connecting rod 60.

A reflecting mirror 61 is pivotally mounted between the two lamps and is disposed at a 45° angle facing the lamp that is energized, in this instance the lamp 58. Light from the lamp 58 is projected generally horizontally to the mirror 61 which deflects it downwardly through a 90 degree angle. The light then passes from the mirror 61 generally vertically through heat absorbing and condensing lenses 62 fixed relative to the console 11 (See FIGS. 1 and 5). It then passes through the upper film clamp 64, the film F, the lower film clamp 65 (See FIGS. 5 and 7), and through magnifying lenses 66 to a reflecting mirror 68 associated with the hood 35 (FIG. 5). The mirror 68 deflects the light, which now defines the film image, through 90 degrees so as to aline it with the axis of projection within the hood 35 and screen 12.

To shift over from the lamp 58 to the lamp 56, the selector lever 25 is pushed downwardly, as shown in FIG. 5. This operates switch 59 through rod 60 to energize the lamp 56 and deenergize the lamp 58. It also pivots the reflecting mirror 61 through an angle of 90 degrees so that it faces the lamp 56. This is effected as by means of bracket 69 fixed to the mirror 61 and pivotally connected to the rod 60.

FILM FRAME IDENTIFICATION AND INDEXING

Turning now to FIGS. 6 and 7, it will be appreciated that the magazine 41 holds film strip F containing photographic reproductions, at 200 miles to the inch, of all the regional navigational charts of the United States. The strip is made from 70 mm film and each frame depicts a complete navigational chart. Each frame is 2 inches square and covers 400 miles on a side, thus representing 160,000 square miles of the earth's surface.

In order to achieve ready retrieval of any given chart depicted on the film strip F each frame is given identifying numerical indicia which may be read automatically by the computer. In this instance, as shown in FIG. 6, a series of seven digit binary numbers is utilized and placed adjacent each film frame in the marginal space between frames. The numbers are read by photoelectric heads 70 through 76 placed in the magazine under one edge portion of the lower film clamp 65 which is transparent glass. Opaque areas 78 adjacent each frame, in different combinations, interrupt light to various ones of the heads 73-76 and thus provide distinguishing indicia.

Accurate positioning of the selected film frame in the magazine window is accomplished by the use of an additional opaque area 79 in the side margin of the film at the center of each frame (FIGS. 6 and 7). The position of the area 79 is read by three photoelectric heads 80, 81, 82. The heads 80 and 82 signal the film drive to slow down as the film frame approaches final position. Head 81 signals the drive to stop and clamp the film in final position.

The magazine 41 is provided with a reversible film drive 84 to effect retrieval of the film frame depicting any selected chart. The drive 84 (FIG. 8) comprises a pair of driving worms 85, 86 secured to a common shaft 88 journaled in a pair of fixed bearings 89, 90. The shaft 88 is driven by means of reversible film drive motor 50 and the flexible shaft 51. The worms 85, 86 are adapted to drivingly engage respective ones of the worm wheels 85a, 86a fixed to the film spools of the magazine.

The worms 85, 86 and bearings 89, 90 are so spaced that when the shaft 88 is driven clockwise, as viewed from the right hand end in FIG. 8, it will move axially so as to disengage the worm 85 from worm wheel 85a. This presses the worm 86 against the fixed bearing 90, causing it to drive the worm wheel 86a clockwise and move the film F to the right. Conversely, when the shaft 88 is driven counterclockwise, as viewed from the right, it will move axially so as to disengage the worm 86 from worm wheel 86a, pressing the worm 85 against the fixed bearing 89 and causing it to drive the worm wheel 85a counterclockwise. This moves the film F to the left as viewed in FIG. 8.

THE ELECTRICAL SYSTEM

The salient features of the electrical system of the computer 10 are shown in the schematic system diagram presented in FIGS. 4a through 4c. The microprocessor CPU may, for example, be a 16 bit device furnished by Texas Instruments Incorporated under the designation TMS 9980 A (See FIG. 4b). Associated with the microprocessor CPU is a RAM memory (Random access memory), a PROM memory (Programmable read only memory), and an EPROM memory (Erasable programmable read only memory), the latter for updating information as required. Computation, which is accomplished through computer programming, utilizes information provided from the memory together with bearing data generated by the navigation radio and digital bearing indicators. The number of functions and complexity of the program determine the memory required. For the described unit 16K bits of RAM, 40K bits of PROM and 80K bits of EPROM (which may be PROM too if desired) are provided.

The system includes a digital counting means whereby the computer can compare calculated position of the craft with indicated position on the screen and develop signals to keep the latter current. For this purpose, as shown in FIG. 4c, the latitude and longitude drive screws 46 and 49, respectively, are equipped with opto interrupters 91, 92. These devices may, for example, be commercial units known as GE H 13 interrupters. They produce electrical pulses on the order of 8 per mile of movement of the picture by passing an opaque portion of a disc between a pair of photoelectric heads a given number of times per revolution of the latitude or longitude drive screw. These electrical pulses are impressed upon a pair of latitude and longitude counters 3 LS 193. The digital output of these counters is hard-wired to an Intel silicon gate MOS 8255-7 which provides an interface with the microprocessor between the counters and the calculating means.

The 8255 gating device is so constructed that certain patterns of instruction bits (address and control logic in Binary form) impressed on the control pins cause it to pass the logic in Binary form thru to the data connecting bus from which the microprocessor may read this data. The 8255 gate is capable of passing on or receiving 24 bits of data in three 8-bit bytes.

The 8255-8 device is a gate which receives Binary information from the film frame reading means and makes it available to the data bus from which the microprocessor may retrieve it for calculating and processing purposes. Similarly, the 8255-1 and 2 gates are wired into the system to interface data from the microprocessor to the LED (Light emitting diode) digits 1, 2, 3, 4, 5 and 6, causing them to illuminate and depict digital data on the readout panel 24.

Gates 8255-3 and 4 perform an interface function, receiving logic from the data bus and latching this data to their output pins which are hard-wired through suitable driver transistors to illuminate the desired sequence of legend lights and pushbuttons.

Gates 8255-5 and 6 interface with the microprocessor and provide data to the frequency synthesizers for NAV 1 and 2 and COM 1 and 2 so that each radio may be tuned to a desired frequency.

Device 74LS 251 is an 8 bit data selector with three state output which permits the microprocessor to retrieve Binary data in serial form from each of its 8 data sources. The microprocessor CPU is able to store this data in its memory when so instructed.

Data selector 74 LS 251-*a* (See FIG. 4*d*) receives a code of 6 binary bits when any one of the individual pushbuttons or keyboard keys is depressed. Each button or key produces its own distinct code through the 74LS 348 network. At the same time as the pushbutton is depressed, a pulse is produced from the G S output of 74LS 348-5 which is felt on input 2 of 74LS 148. This pulse thru LS 148 produces a coded signal to the microprocessor CPU which causes the latter to interrupt its primary program.

Each of the 8 inputs of gate 74LS 251-*b* is connected to a drive limit switch so that when any of the four drives, 1-Film Clamp/Release, 2-Film Strip Wind Drive, 3-Film Carriage Longitude Travel Drive, 4-Film Carriage Latitude Travel Drive have reached the limit of movement its limit switch causes the corresponding input to data selector 251-*b* to go from a high to a low voltage value, i.e. over 2 volts to less than 0.8 volts (See p. 19, infra). Thus the microprocessor may read this information from the data selector.

Data selectors 74LS 251-*c, d* and *e* receive a digital output from omni bearing converters I and II. These converters receive Nav signals from NAV 1 and NAV 2, each of which are tuned to a VOR station within the area of the craft's travel. These signals are such that the omni converters can produce an output indicative of magnetic bearing to the ground located VOR from the craft. Thus this digital bearing information may be retrieved by the microprocessor for computation purposes.

Latch 74LS 259-*c* is capable of receiving and storing bits of data as provided from the microprocessor. This latched information impresses a voltage or ground on the driving amplifiers for each of the four drives previously mentioned, which causes the drive to be activated as directed by the microprocessor CPU thru this latched output device.

Latches 74LS 259-*a* and *b* receive and latch bits of data from the microprocessor which is impressed on the wire and gates connected to 259*a*-0, 4, 5, 6, 7, and 259*b*-0, 1, 2, 3 so that one of these gates will pass a signal when so instructed by the microprocessor and the other gates will not. The gate selected in each instance makes available to the microprocessor VOR data for calculating. Since data is stored for all of the United States, for example, only data pertinent to the chart in view is necessary while that chart is being viewed. Such data is then selected from the EPROM VOR data memory storage bank.

The TMS 9980-A microprocessor utilized in this embodiment is a 16 bit central processing unit with an 8-bit data bus which functions in a manner similar to other such devices in that it may be programmed to perform certain arithmetic and logical operations. In this instance, the primary program may be written into EPROM 1, 2, 3, 4, and 5 as desired and the microprocessor thru the direction of this program will retrieve information from the devices described above and put information into these devices as the program directs.

Provided for the calculating and temporary storage of data for the system is a bank of RAM memory and likewise two four line to one of 16 line data selectors 74LS 154A and B. These selectors are activated by the microprocessor via its address lines to select or enable the input/output devices previously described to fulfill the needs of the software program.

The microprocessor is constructed in such a manner that when energized with the proper voltage and provided with a pulsating frequency, in this case 10 m cycles/second, it performs operations by instructions which it reads in sequence from the software program. There are about 60 different instructions which the microprocessor accepts and for each one performs a specific routine. These instructions are read by the microprocessor from the software program and are 16 bit instructions. They cause it to add, subtract, multiply, divide, compare bytes (8 bits) or words (16 bits) etc. as required to perform the operations desired.

In this case, the primary program would:
(A) Position the chart in view so that the craft location is at the center reticle.
  1. Knowing the frequency set in the omni radios check in the VOR data file for the location (lat. and long.) of these stations on the chart in view.
  2. Read the bearing to each of these VOR stations from the omni bearing converters.
  3. Mathematically calculate the latitude and longitude of the craft.
  4. Compare the position of the reticle on the chart with the calculated latitude and longitude of the craft.
  5. Activate the latitude and longitude drives to make their positions coincide.
(B) Display in sequence on the LEDs and legend lights for a time of 3 seconds each display.
  1. Bearing and distance to the station No. 1 VOR radio is tuned to by:
    (a) read bearing from 74LS 251-*c* and 4 bits from *d* which are a binary code of the magnetic bearing in degrees and display this bearing in LEDs 1, 2, 3.
    (b) calculate the distance from this location of No. 1 VOR radio to the calculated position of the craft and display this in miles on LEDs 4, 5 and 6.
    (c) Energize thru latches 8255-1 and 2, previously described, the proper bits to cause the words "NAV", "1", "Bearing", "Distance" and "To" to illuminate thus identifying the digits displayed.
  2. Bearing and distance to the stations No. 2 VOR radio is tuned to
    (a) read bearing from 74LS 251-*e* and half of *d* (4 bits) and display as above.
    (b) calculate distance to No. 2 VOR station and display as above for VOR 1.
    (c) cause legend lights through 8255-1 and 2 to illuminate as above substituting "2" for "1" as shown above.
  3. Bearing and distance to the destination selected
    (a) calculate bearing and distance from the data collected above and display with appropriate legend lights.
  4. Time and speed to destination (a) calculate from the data collected above and display with appropriate legend lights.

(C) Return to A above and repeat this sequence.

The computer 10 is connected to receive the following inputs:
1. Keyboard to enter
   (a) radio frequencies
   (b) film frame numbers
   (c) elapsed time intervals
   (d) commands (interrupts) to the processor to perform pre-programmed function as desired by the pilot.
2. Film carriage. Lat.-Long. position count available from the counting means through a suitable data source.
3. Digital bearing to each of the two navigational radio sources transmitting from known locations on the chart in view.
4. Film frame identifying means which produces a digital output indicative of the film frame in view.
5. Clock time indicating means.
6. Replaceable pre-programmed memory which contains data of navigational radio facilities with respect to the navigational charts in use. Such data may include:
   (a) Latitude and longitude coordinates of location.
   (b) Bearing correction to convert magnetic bearing output of the radio to true north orientation of the filmed chart. This correction includes two things. One is the magnetic true North variation and a chart correction which has to do with the curvature associated with this type of charting.
7. Other input sources as necessary to perform additional functions which may be programmed, such as:
   (a) altitude—for altitude monitor
   (b) heading, altitude, pitch, etc. for auto pilot
   (c) fuel tank level, consumption, etc.
   (d) engine function indications
   (e) other such aircraft oriented information as may be desired.

The computer 10 is connected to output data devices to produce:
1. Movement of the film carriage in latitude and longitude to position the projected image as required.
2. Illuminate the LED digital display and select the appropriate legend light words to label the data displayed as well as illuminate pushbuttons when active.
3. Set the frequency synthesis counter to tune each of the navigation and com radios to the desired frequencies.
4. Other devices for which it is programmed, such as
   (a) auto pilot
   (b) altitude monitor
   (c) engine function display
   (d) etc.

SYNOPSIS OF OPERATION

A. Computer power up reset and initializing of all inputs and outputs;

When power is applied to the computer the microprocessor is constructed in such a manner that an input code causes it to go to an initial address which is the start of the computer program. In this instance, this is initialized by a delayed pulse through the power up reset interrupt (1) to input 6 of LS148. This starts the computer program at EPROM OB. All outputs are set to a predetermined mode.

(a) Lat. Long. drive latches 74LS 259-d and film drive are made inactive.
(b) LED digital display is made inactive. This latch is 8255-1 and 8255-2.
(c) Legend light display is made inactive. This latch is 8255-3 and 4.
(d) Radio tuning latches 8255-5 and 6 are set to preset and predetermined frequencies.
(e) VOR data selecting latch 74LS 259-a and b is set at zero output until the film frame has been finally selected.
(f) RAM memory is cleared.
(g) Latch 8255-8 is set in the input mode and the film "Read in" signals are tested to see if a film frame is in place. If so, the frame number is read and displayed on LEDs 1, 2, 3 with legend words "Chart No." illuminated. If no film is in place, the film clamp is released and the drive is activated to move the film strip in the increase direction to the next frame at which time the film is reclamped. The frame number is displayed as above. If the film reaches the end limit in the increase direction, the drive is reversed and stopped at the next lower frame, reclamped, and the frame number is displayed as above.

B. Initial Pilot Inputs

The pilot may select another frame by pressing the "RECALL" pushbutton which creates an interrupt that the microprocessor CPU recognizes. The initial pulse causes a voltage to go from >2 V to <0.8 V on pin 7 of 74LS 348-3 which transmits through 74LS 348-5 via GS to pin 2 of LS 148 and thence to the microprocessor CPU. The microprocessor in responding to this code brings a code in from 74LS 251 which outputs were latched as the pulse on "RECALL" pin 7 of LS 348-3 was felt. This specific code causes the microprocessor to display in LEDs 4, 5 and 6 from RAM memory the first of four chart numbers which may have been previously entered. Since this is the start-up and no numbers have been entered, the LEDs will display chart number in view on 1, 2, 3 and 000 on LEDs 4, 5 and 6.

The pilot may enter a new chart number by pressing digit keys 0–9. Such pulsing of these pushbuttons will send a different code for each digit which the CPU interprets to place the selected digit in LEDs 4, 5 and 6. The pilot may then press "ENT.MEM" (Enter memory). The chart number will be placed in RAM memory. He may then press "ENT. COMP." and the CPU will go through a routine which will release the film clamp and drive the film until the selected frame number as read by the film reading means is in the projection system and reclamp the film at this point.

When the film frame is in place the CPU will cause the latitude and longitude drives via latch 74LS 259-d to drive in the decrease direction to the limit. When both latitude and longitude carriage travel limits have been hit the CPU will load the latitude and longitude counters via latch 74LS 259-c with a binary 1CO or decimal 448. It will then activate the Opto interrupter counting system and drive the film carriage to its center position binary count of 800 (Hexidecimal) by comparing actual position count of the counters with the desired location.

At this point it will flash the legend lights "ENTER" "CHART" and "LOCATION" which is a signal to the pilot to center the center mark on the film with the center mark or reticle of the screen by slewing the picture. This should require little or no adjustment. He would then press "ENTER COMP." and the counting means will be locked into the film latitude and longitude travel with a count of 800 Hexidecimal at the center mark for each of latitude and longitude.

The CPU will then set latches 74LS 259-a and b so that the VOR memory associated with the chart in view is available to the CPU for calculation.

The pilot may slew the picture to any location on the 400 mile square chart. From the low altitude IFR charts, for example, he may read VOR frequencies and tune the two VOR radios to a station within his receiving range.

Tuning the VOR radios is accomplished by pressing Pushbutton 21 for NAV 1 at which time an interrupt will be initiated as previously described. The code received by the CPU from latch 74LS 251-a will be interpreted to display the frequency to which NAV 1 is tuned. In the start-up condition as previously initialized this could be, for example, 108.00. Legend lights will show "NAV 1 FREQUENCY". He may then press "RECALL" and the LED display will show 000.000. Legend lights will show "ENTER NAV 1 FREQUENCY". Pushbuttons 0–9 will be active and he may enter a new frequency which will show up as the pushbuttons are pressed in the digital display LEDs. When this is complete the "ENT MEM" pushbutton will become active and he may press it to place this frequency in memory. If he wishes to tune this station he may then press "ENT COMP" at which time the CPU will slew the picture to the location of the VOR to be tuned and blink the "ENTER NAV 1 FREQUENCY" legend lights. This is a signal to the pilot to double check VOR location and frequency which will be used for computation. If satisfied that the location of the VOR falls within the reticle, he presses "ENT MEM" again and the CPU places a code in output latch 8255-5 which through frequency synthesis tunes NAV 1 to the selected frequency. If the VOR to be tuned is not displayed within the reticle, the pilot may slew the picture to bring them into register. This slewing action will provide the computer with a corrected VOR location. He then presses "ENT MEM" once more and the CPU places a code in output latch 8255-5 which through frequency synthesis tunes NAV 1 to the selected frequency. This procedure is used each time the pilot chooses another navigation station.

A second impulse on "RECALL" after LED display above of 000.000 will recall from memory frequencies that may have been previously entered. Successive pressing of "RECALL" will bring back up to four frequencies any one of which may be tuned as above described or replaced in memory with another frequency as described and tuned at a later time.

The same sequence is available for NAV 2, COM 1 and COM 2. In the case of the COM frequencies the step described of slewing the picture is of course deleted and the first pressing of "ENT COMP" results in tuning the radio to the displayed frequency.

A destination or way point may be selected by pressing the "DEST" pushbutton at which time the picture will slew to a location previously entered into computation, if any. If none, the initialized location will be 800 Hex or center of the picture. He may then press "RECALL", the picture will slew to the first location in memory, and then activate manual slewing controls at which time the pilot may slew the picture to any other location. This followed by "ENT MEM" to place the new location in memory and then by "ENT COMP" will place this location in the computations.

Successive impulses on "RECALL" above will bring back up to four previously selected locations from memory, any one of which can be changed or entered into computation by following the sequence described above.

C. Automatic Operation

When the filmstrip has been properly centered and two NAV radios have been tuned to receive an output bearing signal, the computer 10 device will react to an impulse on the "AUTO" pushbutton. It will go through a programmed routine and calculate the craft location and produce drive signals to the latitude-longitude driving means to position the film such that the reticle on the screen 12 represents the location of the craft. As long as this is in "AUTO" operation, the computer will continue to update the craft location.

As a part of the routine in automatic operation, the computer will calculate bearing and distance from the craft to each NAV facility, to the selected destination, and time and speed to the destination at the rate of travel during the previous 16 seconds and during the previous 512 seconds. These calculations will be displayed as a digital readout on the LEDs with appropriate illuminated legend words to identify each in sequence. Each display lasts, for example, 3 seconds and then repeats the sequence. If the pilot desires to hold any one display he may press the "HOLD" pushbutton and the current display will remain but be updated as data changes. He may return to AUTO sequencing by pressing the "AUTO" pushbutton again. The automatic sequence items may be expanded to include time remaining items identified by the first LED digit. This could be 0→9 and a time in hours in the second digit, minutes in the third and fourth digits, and seconds in the fifth and sixth digits. This would be set up by the pilot by pressing "ELAPSED TIME". The CPU would set up the time sequence memory for interrogation and display the identification number of the shortest time to termination digit 1 and then the time remaining in the next 5 digits. Repeated pressing of "ELAPSED TIME" will bring back other times in sequence. If the second digits are changing, this time has been activated. If not, it is in memory. Where no identification number or time shows, the pilot may enter a digit (0–9) in LED 6 as the identification of an additional time sequence and press "ENT MEM". CPU displays the digit in LED 1 and illuminates the decimals in digits 2–6. He may then enter a new time elasped interval in digits 2–6. He presses "ENT MEM" and the time goes into memory. The "ENT COMP" pushbutton becomes active and he may press it to start the time sequence.

The CPU monitors all time sequences activated and displays them with the appropriate identification number in the sequential display at intervals as follows:

At 16 minute intervals over 64 minutes remain of the time sequence

At 8 minute intervals over 16 minutes remain of the time sequence

At 4 minute intervals over 4 minutes remain of the time sequence

Counts from 4 minutes down as a regular entry in the sequential display. This may be displayed exclusively if "HOLD" is activated when it is being shown.

The pilot may RECALL as above, then press "ENT COMP" to activate any previously entered interval of time, i.e., Final approach fix to missed approach for visual count down on approach to an airprt.

D. Manual Controls
1. Picture focus 32 which adjusts the distance of the lens from the film to permit best focusing of the image on the screen.
2. Projection lite dim control 31 which reduces voltage on the 12 Volt projection lights to adjust the brilliance of the image. Advantageous at night.
3. Automatic-Manual on-off switch 30. Places voltage on manual control switches so the computer circuits can be bypassed for picture slew, latitude-longitude drive, and film clamp and strip drive so that the film system can be used if the computer is not functioning and the picture can be viewed through the image on the screen.
4. Film clamp switch 29 with three positions: release, clamp, and off.
5. Film strip drive switch 28; drive may be moved independently of computer movement.
6. Latitude-longitude slew control comprised of a joy stick type control 26 which moves film frame in the axis of projection.
7. Projection light power switch 59 which switches the power from lamp 56 to lamp 58.
8. Projection light source lever 25 which tilts the reflecting mirror to place either projection lamp in the projection system.

I claim as my invention:

1. An on-board computer for movable craft comprising, in combination:
   (a) means defining a pictorial representation of a portion of the earth's surface;
   (b) a viewing screen having a stationary mark thereon representing the position of the craft relative to the earth's surface;
   (c) means for projecting a portion of the pictorial representation of the earth's surface on said screen;
   (d) means for continuously calculating the actual position of said craft from the bearing signals of two selected radio transmitting stations;
   (e) means for entering the frequency of each said selected navigation radio transmitting station to be used for reference by said calculating means;
   (f) means for immediately showing on said viewing screen the chart location of said station to verify that the location coordinates corresponding to the entered navigation frequency accurately locate said station; and
   (g) means for correcting said navigation station location by the pilot if necessary.

2. An on-board computer for movable craft comprising, in combination:
   (a) a plurality of film charts each defining a pictorial representation of a portion of the earth's surface;
   (b) a viewing screen having a stationary reticle thereon representing the coordinates of a given point on a selected one of said charts;
   (c) means for projecting a selected one of said film charts on said screen;
   (d) a data storage memory containing the locations of the navigational radio stations encompassed within said selected film chart; a microprocessor programmed to calculate continuously the actual position of said craft in representations of latitude and longitude coordinates from the bearing signals of the selected radio transmitting stations and data stored in said data storage memory;
   (e) means for utilizing the frequency of a selected navigational radio station to retrieve from said read-only memory the location of said station with respect to said selected chart;
   (f) means for positioning said selected chart to show the location information within said data storage memory associated with said navigational radio station relative to said reticle;
   (g) a computing memory connected to said microprocessor adapted to receive, store and deliver computing information; and
   (h) means for enabling the pilot to insert a corrected location of said station in said computing memory in the event that the station as retained in the data storage memory deviates from the actual location as shown on the chart.

3. An on-board computer for movable craft comprising, in combination:
   (a) means defining a plurality of film charts pictorially representing given portions of the earth's surface;
   (b) a magazine housing said charts;
   (c) a viewing screen having a stationary reticle thereon representing the position of the craft relative to the earth's surface;
   (d) means for projecting a selected one of said film charts on said screen;
   (e) radio receiver means adapted to produce signals indicative of the bearing of each of two selected radio transmitting stations;
   (f) means for continuously calculating the actual position of said craft from the bearing indicative signals of said radio transmitting stations;
   (g) means for selecting an alternate radio transmitting station during in-flight operation of said computer;
   (h) means for checking and pilot correction of the location coordinates of said alternate transmitting station relative to said selected one of said charts during in-flight operation of said computer; and
   (i) means for shifting to said alternate transmitting station without interfering with the calculating operation of the computer.

4. The combination set forth in claim 3, wherein each said chart comprises a frame in a strip of film housed in said magazine; each said film frame has identifying indicia adjacent thereto in the space between successive frames, and said magazine includes sensing devices for reading said indicia.

5. An on-board computer for movable craft comprising, in combination:
   (a) means defining a plurality of film charts pictorially representing given portions of the earth's surface;
   (b) a magazine housing said charts;
   (c) each said chart comprising a frame in a strip of film housed in said magazine;
   (d) each said film frame having identifying indicia adjacent thereto in the space between successive frames;
   (e) each said film frame including additional indicia on one side thereof for centering same;
   (f) said magazine including sensing devices for reading said indicia and additional sensing devices for reading said additional indicia;
   (g) a viewing screen having a stationary reticle thereon representing the position of the craft relative to the earth's surface;
   (h) means for projecting a selected one of said film charts on said screen;
   (i) radio receiver means adapted to produce signals indicative of the bearing of each of two selected radio transmitting stations;

(j) means including a microprocessor for continuously calculating the actual position of said craft from the bearing signals of said two selected radio transmitting stations; and (k) means for continuously driving said magazine and said selected chart to maintain the indicated position of said craft thereon in conformity with the actual position of said craft.

6. An on-board computer for movable craft comprising, in combination:

(a) means defining a plurality of film charts pictorially representing given portions of the earth's surface;

(b) a magazine housing said charts on a pair of film spools;

(c) said magazine having a film drive comprising a pair of worm wheels on respective ones of the film spools and a pair of worms fixed in axially spaced relation on a drive shaft with their centers a greater distance apart than the distance between the axes of said worm wheels, whereby only either one of said worm wheels is driven selectively by reversing the rotation of said drive shaft;

(d) a viewing screen having a stationary reticle thereon representing the position of the craft relative to the earth's surface;

(e) means for projecting a selected one of said film charts on said screen;

(f) radio receiver means adapted to produce signals indicative of the bearing of each of two selected radio transmitting stations;

(g) means including a microprocessor for continuously calculating the actual position of said craft from the bearing signals of said two selected radio transmitting stations; and (h) means for continuously driving said magazine and said selected chart to maintain the indicated position of said craft thereon in conformity with the actual position of said craft.

7. The combination set forth in claim 5, wherein said driving means is controlled by a counting means and the latter is operated by pulses from opto interrupters connected to said driving means.

8. An on-board computer for movable craft and adapted to derive input from radio naviagation systems, said computer comprising the combination of:

(a) means defining a pictorial representation of a portion of the earth's surface;

(b) a viewing screen having a stationary reticle thereon representing the position of the craft relative to the earth's surface;

(c) a pair of spaced apart projection lamps adapted to be energized selectively;

(d) means for projecting a portion of the pictorial representation of the earth's surface on said screen while shifting the projection axis 90 degrees between the energized one of said projection lamps and said pictorial representation means, and 90 degrees between said pictorial representation means and said screen;

(e) means including a microprocessor for continuously calculating the actual position of said craft from the bearing signals of two selected radio transmitting stations; and (f) means for continuously driving the pictorial representation of the earth's surface to maintain the indicated position of said craft thereon in conformity with the actual position of said craft.

9. The combination set forth in claim 8, wherein said projecting means comprises:

(d1) a first lens mounted on one side of said pictorial representation means;

(d2) a second lens mounted on the opposite side of said pictorial representation means on a common projection axis passing through the latter;

(d3) a first mirror disposed on said common projection axis between said projection lamps and adjacent said first lens;

(d4) means mounting said first mirror for selective adjustment at an angle of substantially 45 degrees facing the energized one of said projection lamps;

(d5) a second mirror disposed on said common projection axis between said second lens and said screen; and (d6) said second mirror being mounted at an angle of substantially 45 degrees facing said screen.

10. The combination set forth in claim 9, and which further comprises:

(d7) a switch for selectively energizing said projection lamps; and (d8) a common actuator for said switch and said selective adjustment mounting means of said first mirror.

11. In an on-board computer for movable craft, the combination comprising:

(a) means defining a plurality of film charts pictorially representing given portions of the earth's surface;

(b) a magazine housing said film charts;

(c) a viewing screen having a stationary reticle thereon representing the position of the craft relative to the earth's surface;

(d) means including a pair of axially spaced apart projection lamps for projecting a selected one of said film charts on said screen;

(e) a first lens mounted on one side of said magazine;

(f) a second lens mounted on the opposite side of said magazine on a common projection axis passing through said selected one of said film charts;

(g) a first mirror disposed on said common projection axis between said projection lamps and adjacent said first lens;

(h) means mounting said first mirror for selective adjustment at an angle of substantially 45 degrees facing the energized one of said projection lamps;

(i) a second mirror disposed on said common projection axis between said second lens and said screen; and (j) said second mirror being mounted at an angle of substantially 45 degrees facing said viewing screen.

12. An on-board computer for movable craft as set forth in claim 3, and which further comprises a console containing all components thereof, together with said radio receiver means, said console being of a size adapting it to fit into an instrument panel space heretofore reserved for conventional navigation and communication radios.

13. An on-board computer for movable craft as set forth in claim 2, and which further comprises a console containing all components thereof, together with navigation radio receiver means and communication radio transmitter receiver means, said console being dimensioned to fit into an instrument panel space normally reserved for conventional navigation and communication radios.

* * * * *